(No Model.)
G. W. HARRINGTON.
METHOD OF PREPARING THE ENDS OF LINED PIPES FOR JOINTING
No. 489,949. Patented Jan. 17, 1893.
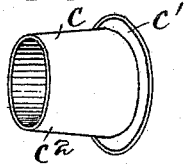
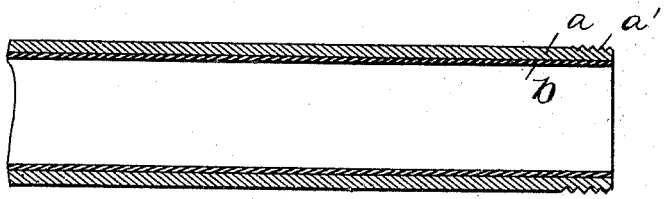
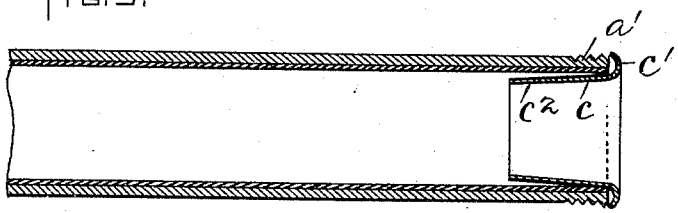
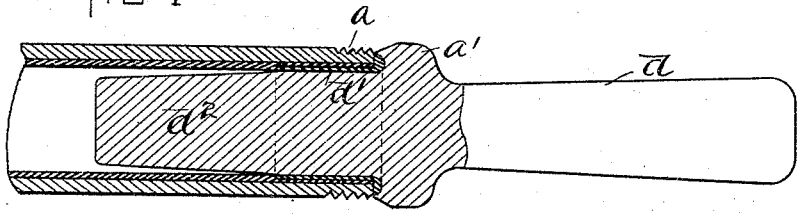
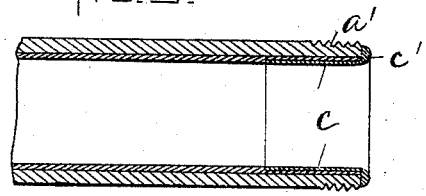
WITNESSES:
INVENTOR:
George W. Harrington

UNITED STATES PATENT OFFICE.

GEORGE W. HARRINGTON, OF WAKEFIELD, MASSACHUSETTS, ASSIGNOR OF ONE-HALF TO D. H. DARLING, OF SAME PLACE.

METHOD OF PREPARING THE ENDS OF LINED PIPES FOR JOINTING.

SPECIFICATION forming part of Letters Patent No. 489,949, dated January 17, 1893.

Application filed April 18, 1892. Serial No. 429,558. (No model.)

*To all whom it may concern:*

Be it known that I, GEORGE W. HARRINGTON, of Wakefield, in the county of Middlesex and State of Massachusetts, have invented certain new and useful Improvements in Methods of Preparing the Ends of Lined Pipes, of which the following is a specification.

My invention relates to an improved method of preparing the ends of lead lined pipe in such manner that a close joint will be secured in a simple and effective manner.

The invention consists in forming screw threads in the end of a section of the pipe to accommodate the sleeve or other coupling, introducing a thimble shaped piece of lead having a shoulder or flange on its larger end into the end of the section, then forcing into the thimble a tapering swage or plug having an annular recess into which the shoulder or flange of the thimble is packed against the end of the pipe section. The swage or plug presses the thimble into the lining of the pipe, so that the inner circumference of the lining remains the same, the advantage lying in the bead or packing formed in the end of the pipe, against which another section similarly prepared abuts, or a coupling having an interior shoulder of lead may be used, if desired.

My invention will be better understood in connection with the accompanying drawings, in which I have shown an application of my improved method and in which Figure 1 is a detail of the thimble. Fig. 2 represents a section of lead lined pipe provided with screw threads. Fig. 3 represents a section of the pipe with the thimble inserted. Fig. 4 shows the plug forced home within the thimble, and Fig. 5, the finished end.

Pipe $a$ is provided with thread $a'$ and with lead lining $b$. Thimble $c$ having tapered portion $c^2$ and flange $c'$ is inserted in the pipe so that flange $c'$ will project outwardly over the end of said pipe. Plug $d$ having shoulder $d'$ and recess $d^4$, is tapered considerably in one portion, as at $d^3$, and very slightly, as at $d^2$. It will be readily understood that as portion $d^2$ is of the same diameter as the inside of the lining, when the thimble is in place the plug will force the lead of the thimble into the lining of the pipe and that the recess $d^2$ of the said plug will pack the flange $c'$ into a bead, as shown in Fig. 4, against which the next similar section of pipe or shoulder of a coupling will abut to form a continuous lining of lead.

I claim:

The method of preparing the ends of lead lined pipe, which consists in inserting a tapered thimble of lead having a flange thereon into said lining and driving into said thimble a tapering swage or plug of suitable hard substance, so that the tapering portion of the thimble will be driven into the lead lining and the flanges on said thimble curled or packed against the end of the main shell, as described.

In testimony whereof I have signed my name to this specification, in the presence of two subscribing witnesses, this 11th day of April, A. D. 1892.

G. W. HARRINGTON.

Witnesses:
M. W. JACKSON,
A. D. HARRISON.